United States Patent [19]

Sevelinge

[11] Patent Number: 4,879,927
[45] Date of Patent: Nov. 14, 1989

[54] POSITIONING DEVICE FOR SCREWING AND UNSCREWING A NUT

[75] Inventor: Gérard Sevelinge, Montceau Les Mines, France

[73] Assignee: Framatome, Courbevoie, France

[21] Appl. No.: 39,127

[22] Filed: Apr. 16, 1987

[30] Foreign Application Priority Data

Apr. 18, 1986 [FR] France ................. 86 05614

[51] Int. Cl.$^4$ ............................................. B25B 21/00
[52] U.S. Cl. .......................................... 81/56; 81/125
[58] Field of Search .................. 81/52, 57.38, 57.14, 81/57.11, 54, 56, 125, 55; 254/29 A; 29/452

[56] References Cited

U.S. PATENT DOCUMENTS

| 3,128,990 | 4/1964 | Brooks et al. | 81/57.38 |
| 3,306,140 | 2/1967 | Smiley | 81/56 |
| 3,679,173 | 7/1972 | Rerrick et al. | 254/29 A |
| 4,207,784 | 6/1980 | Exner et al. | 81/54 |
| 4,433,828 | 2/1984 | Spiegelman et al. | 254/29 A |
| 4,438,901 | 5/1984 | Reneau et al. | 29/452 |

FOREIGN PATENT DOCUMENTS 2208756  6/1974  France .
2367574  5/1978  France .
2139128  11/1984  United Kingdom .

Primary Examiner—James G. Smith
Attorney, Agent, or Firm—Pollock, Vande Sande & Priddy

[57] ABSTRACT

The automatic positioning device for screwing and unscrewing a nut (9) on a screwing element (4) formed, for example, by a pin or a threaded rod comprises an externally threaded bush (24) for transferring the nut (9) and an arrangement for the axial centering and angular wedging of the bush (24) relative to the screwing element (4), to generate a continuous helical slope between the external threads (26) of the bush (24) and the threads (8) of the screwing element (4).

4 Claims, 2 Drawing Sheets

POSITIONING DEVICE FOR SCREWING AND UNSCREWING A NUT

FIELD OF THE INVENTION

The present invention relates to a positioning device for screwing and unscrewing a nut, particularly a nut tensioning large-size screwing elements.

BACKGROUND OF THE INVENTION

In industrial installations using large-size screwing elements, during tightening and loosening operations a pull is exerted on the elements by means of a tensioning device, in order to keep them in a pre-stress state.

This applies particularly to nuclear reactors, where a cover is fastened removably on a vessel, to permit periodic reloading of the reactor with fuel and, inspection of the vessel interior.

For this purpose, the cover is fastened on the reactor vessel by means of large-size pins which are screwed into the collar of the vessel and which penetrate into smooth holes provided in the collar of the cover. These pins are usually used in fairly large numbers and are relatively close to one another, with a result that, to remove and refit the cover, it is necessary to unscrew and rescrew all these pins, and also tension them during each screwing and unscrewing operation.

This tensioning of the pins during each screwing and unscrewing operation is usually carried out by an assembly of jacks exerting a pulling force on each pin by means of an engaging piece consisting, for example, of a tensioning nut screwed onto the free end of the pin.

In view of the considerable weight of the pins and tensioning nuts, the screwing of the nuts is a difficult operation, since it is possible to ensure that these various elements are coaxial only by trial and error, and this risks causing damage to the first thread as a result of the absence of any centering of the nut relative to the pin and the lack of angular adjustment. Consequently, each operation requires a new search in order to align the threads with one another. A relatively extensive period of time is required to carry out this operation and, as a result, the personnel performing the work risks remaining in a zone of excessively high radioactive radiation for far too long.

FR-A-2,367,574, discloses a device for fitting and removing pins, in which the nut used for tightening and prestressing the pin has, in its lower part, a threaded end piece with a finger limiting screwing onto the pin and, in its central part, a spherical stop interacting with a receptacle of matching shape. The upper end of the nut is connected to a system with a double cardan joint, and the assembly as a whole is associated with an elastic suspension.

In the stage of searching for the ideal screwing position, the kinematic chain resulting from the association of these elements gives the nut a ball-and-socket movement, thus giving rise to undesirable friction, mainly in the region of contact between the two spheres.

SUMMARY OF THE INVENTION

The object of the invention is, therefore, to provide an automatic positioning device for screwing and unscrewing a nut, which is of simple construction and which makes it possible, in every operation, to ensure that the nut is coaxial with the pin.

According to the invention, the device comprises an externally threaded bush for transferring the nut, and means for the axial centering and angular wedging of the bush relative to the screwing element, to generate a continuous helical slope between the external threads of the bush and the threads of the screwing element. The means for the axial centering of the transfer bush relative to the screwing element consist of an extension piece placed on the head of the screwing element and in its upper part having a centering stud, on which the bush is positioned coaxially relative to the axis of the screwing element. The means for the angular wedging of the transfer bush relative to the screwing element consist of an axially directed retractable finger fitted in the bush and interacting with an adjusting washer.

BRIEF DESCRIPTION OF THE DRAWINGS

In order that the invention may be more clearly understood, an embodiment of the device according to the invention will now be described with reference to the accompanying drawings in which.

DESCRIPTION OF PREFERRED EMBODIMENT

Figure 1:
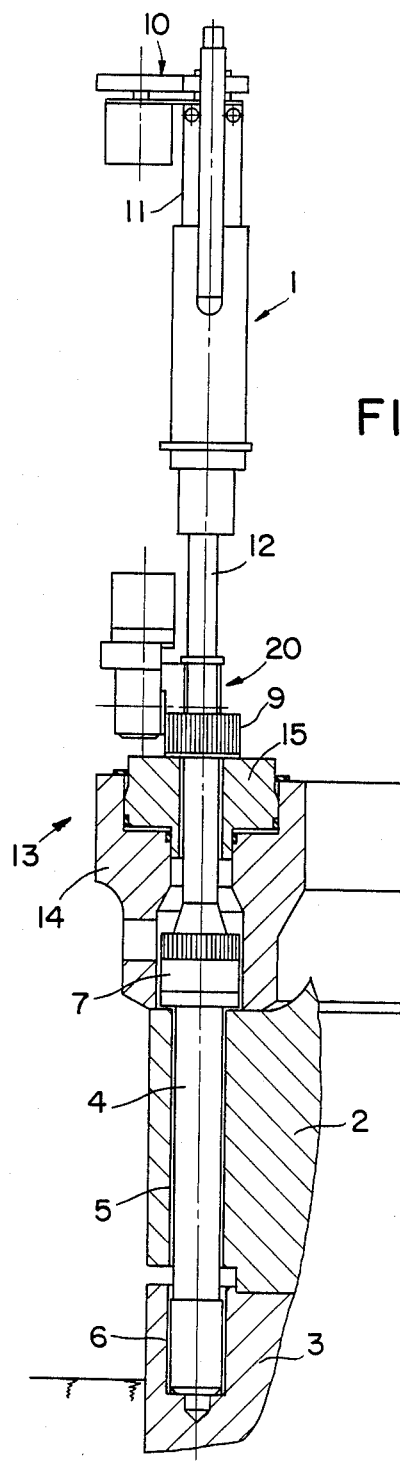
FIG. 1 is a plan view of a screwing robot equipped with the device according to the invention.

The screwing and unscrewing robot 1, shown in FIG. 1 is used to open or close the cover 2 of a vessel 3 belonging, for example, to a nuclear reactor.

As is well known, the cover 2 and the vessel 3 have a form of revolution about a vertical geometrical axis. The cover 2 is fastened detachably on the vessel 3 by means of several pins 4 of vertical axis, which are uniformly distributed on the periphery of the cover 2 and of the vessel 3.

Each pin 4 passes through a smooth hole 5 provided vertically in the peripheral edge of the cover 2, and is a threaded lower part to be screwed into a tapped hole 6 in the peripheral edge of the vessel 3, and a threaded middle part onto which is screwed a vessel nut 7 bearing on the upper face of the peripheral edge of the cover 2. The pin 4 has, in its upper part, threads 8 which make it possible to screw a tensioning nut 9.

The screwing and unscrewing robot 1 comprises a system 10 for locating the ideal screwing position of the pin 4, including a shaft 12 which makes it possible to exert a drive torque on the pin in both directions.

The tensioning of the pins 4 is carried out by means of a device 13 which exerts a pull on the pins, in order to keep them in a prestress state, so as to allow the vessel nuts 7 to be tightened or loosened in this position. This tensioning device 13 consists of a bearing ring 14 having a form of revolution about a vertical geometrical axis corresponding to the form of revolution of the cover 2. The bearing ring 14 bears on the upper face of the peripheral edge of the cover 2 and has a series of jacks 15 which exert a pull on the pins 4 via the nut 9 screwed onto the upper part of each pin.

To make it possible to screw and unscrew the tensioning nut 9, the screwing robot includes an automatic positioning device which is designated as a whole by the reference 20 and which will be described in more detail with reference to FIG. 2, Which shows a jack 15 of the bearing ring of the tensioning device and the upper end of the pin 4, with its upper thread 8, onto which the tensioning nut 9 is screwed.

The tensioning nut 9 has, on its outer periphery, a toothing 9a which interacts with a geared motor 16 for screwing and unscrewing nut 9.

The positioning device 20 is composed of an extension piece 21 screwed onto the head of the pin 4 and locked on the latter. This extension piece 21 has, in its upper part, a centering stud 21a and a central recess 21b, in which the end of the shaft 12 of the screwing robot 1 is locked by means of a ball-type locking system 37.

An adjusting washer 22 is placed on the centering stud 21a of the extension piece 21. This adjusting washer 22 has a smaller vertical hole 22a and is wedged on the extension piece 21 in a specific position by means of at least one screw 23, as will be described hereinbelow.

A threaded bush 24 is positioned coaxially relative to the axis of the pin 4 by means of the centering stud 21a of the extension piece 21 and so as to bear on the upper face of the adjusting washer 22. To position it on the centering stud 21a, the threaded bush 24 has an inner recess 25 which also allows the end of the shaft 12 to pass through.

Moreover, the threaded bush 24 has a threaded outer part 26 intended to receive the tensioning nut 9 and, in its upper part, a collar 27 equipped on its periphery with a toothing 28 interacting with a drive wheel 17 of a geared motor 18 for rotating the bush 24. The diameter and pitch of the threaded outer part 26 of the bush 24 are identical to the diameter and pitch of the upper thread 8 of the pin 4.

Finally, fitted inside the threaded bush 24 in a vertical receptacle 29, parallel to the axis of the bush, is a finger 30 associated with an elastic element 31. The finger 30 can either retract into its own receptacle 29, thus allowing the threaded bush 24 to rotate, or penetrate into the small hole 22a in the adjusting washer 22.

The device thus described operates as follows:

First of all, the extension piece 21, on which the adjusting washer 22 rests, is fastened permanently on the pin 4. The positioning of the washer 22 on the extension piece 21 by means of at least one wedging screw 23 is previously set angularly, so that the position of the small hole 22a determines a position for the start of the thread 26 of the threaded bush 24 corresponding to the end of the upper thread 8 of the pin 4.

After the extension piece 21 has been fastened on the head of the pin 4 and the adjusting washer 22 has been positioned, the pin 4 is screwed by means of the screwing robot 1 into the tapped hole 6 in the vessel 3, and the vessel nut 7 is screwed onto the intermediate thread of the said pin, and then the bearing ring 14 of the tensioning device 13 is fitted.

Subsequently, the tensioning nut 9 is screwed onto the upper thread 8 of the pin 4, and the pin 4 is tensioned by means of the jack 15 to ensure the tightening of the vessel nut 7.

After this operation, in order to remove the tensioning nut 9, the threaded bush 24 is positioned coaxially relative to the axis of the pin 4 by means of the centering stud 21a of the extension piece 21 and so as to bear on the upper face of the washer 22 previously set angularly, and then the threaded bush 24 is rotated a fraction of a revolution by means of the gear wheel 17 of the geared motor 18 interacting with the toothing 28, so that the retractable finger 30 snaps into the small hole 22a of the washer 22.

The Centering and angular wedging of the threaded bush 24 relative to the pin 4 are thus obtained in such a way that the position of the start of the thread of the bush 24 corresponds to the position of the end of the thread of the pin.

Figure 2:
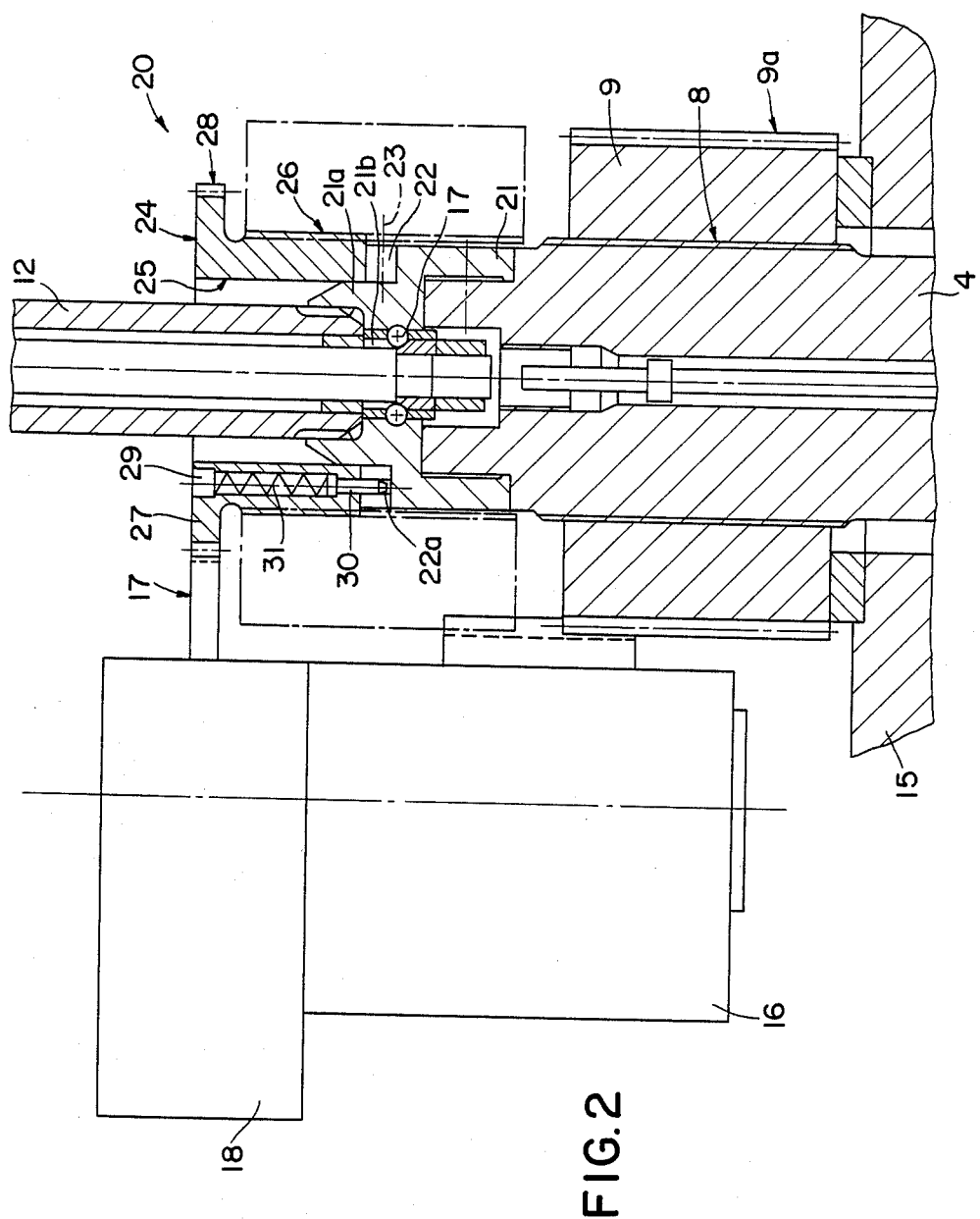
FIG. 2 is a view of the device according to the invention in a larger scale.

The device, centered and wedged angularly in this way, makes it possible, after the tensioning device has been released, automatically to unscrew the nut 9 from the pin 4 and screw it onto the threaded bush 24 by means of the geared motor 16, as represented by dot-and-dash lines in FIG. 2.

The threaded bush 24 supporting the tensioning nut 9 can easily be removed from the extension piece 21 and then refitted when the said nut is screwed onto the pin head once again.

After the retractable finger 30 has been repositioned in the small hole 22a of the adjusting washer 22, it is sufficient to actuate the geared motor 16 in order to rescrew the nut 9 onto the upper thread 8 of the pin 4.

This arrangement makes it possible to ensure that the pin and the nut are coaxial relative to one another and that the nut is engaged properly on the threads of the pin as a result of the indexing of the threads of the bush which, together with the threads of the pin, generate a continuous helical shape.

These two advantages are independent of the variations in the angular position of the pin head and in its level of screwing in the vessel collar.

One of the particular features of the present device is that it allows the first thread of the nut to be engaged with the first thread of the bush while the last threads of the said nut are still engaged with the threads of the pin. This ensures that the nut is guided, without the possibility that it will tilt on the threads and escape from them, so that there is better guidance in the process of re-engaging and rescrewing the nut.

The device according to the invention is suitable for use not only in nuclear power stations, but also in petroleum and petrochemical installations, in mining installations or for closing turbines, hydraulic valves, pressurized pipelines or valve bodies. In able for use in many industrial installations which employ large-size screwing elements.

What is claimed is:

1. An automatic positioning device for screwing and unscrewing an independent nut (9) on a screwing element (4) having external threads (26), said device comprising
    (a) an externally threaded bush (24) for transferring said nut (9);
    (b) means for axial alignment of said bush (24) relative to said screwing element (4), said means comprising an extension piece (21) placed on a head of said screwing element and having a centering stud (21a) in its upper part, on which stud said bush (24) is positioned coaxially relative to an axis of said screwing element (4); and
    (c) means for angular alignment consisting of an axially directed retractable finger (30) fitted in said bush (24) and interacting with an adjusting washer (22) resting on said extension piece (21).

2. Device according to claim 1, wherein said adjusting washer (22) has a small vertical hole (22a) for receiving an end of said retractable finger (30) associated with an elastic element (31).

3. Device according to claim 1, wherein said adjusting washer (22) is arranged on said centering stud (21a) of said extension piece (21) underneath said bush (24).

4. Device according to any one of claims 1 to 3, wherein said bush (24) has, in its upper part, a collar (27) equipped on its periphery with a toothing (28) interacting with a drive wheel (17) of a geared motor (18) for rotating said bush (24), in order to position said retractable finger (30) in said small hole (22a) of said adjusting washer (22).

* * * * *